M. BELOBROJDIC.
DIRIGIBE HEADLIGHT FOR AUTOMOBILES.
APPLICATION FILED JUNE 16, 1917.
1,248,999.
Patented Dec. 4, 1917.
2 SHEETS—SHEET 1.
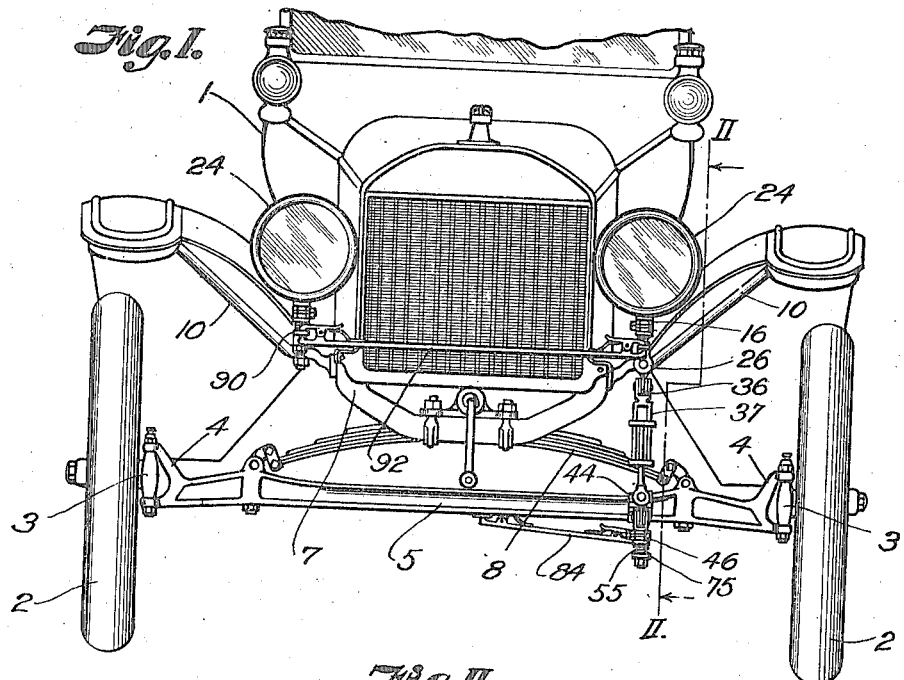
Fig. I.
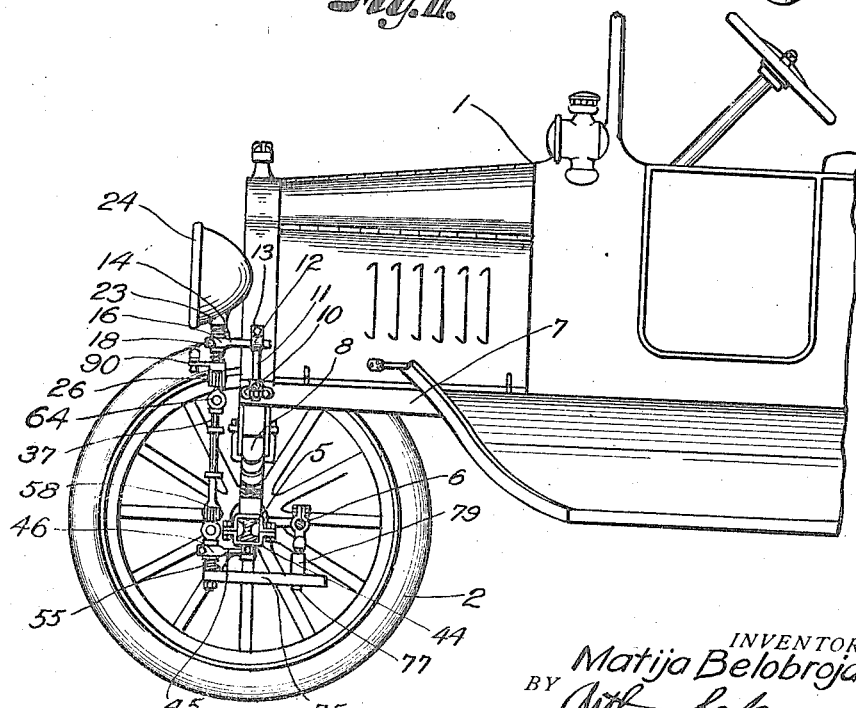
Fig. II.
INVENTOR.
Matija Belobrojdic
BY Arthur C. Brown
ATTORNEY

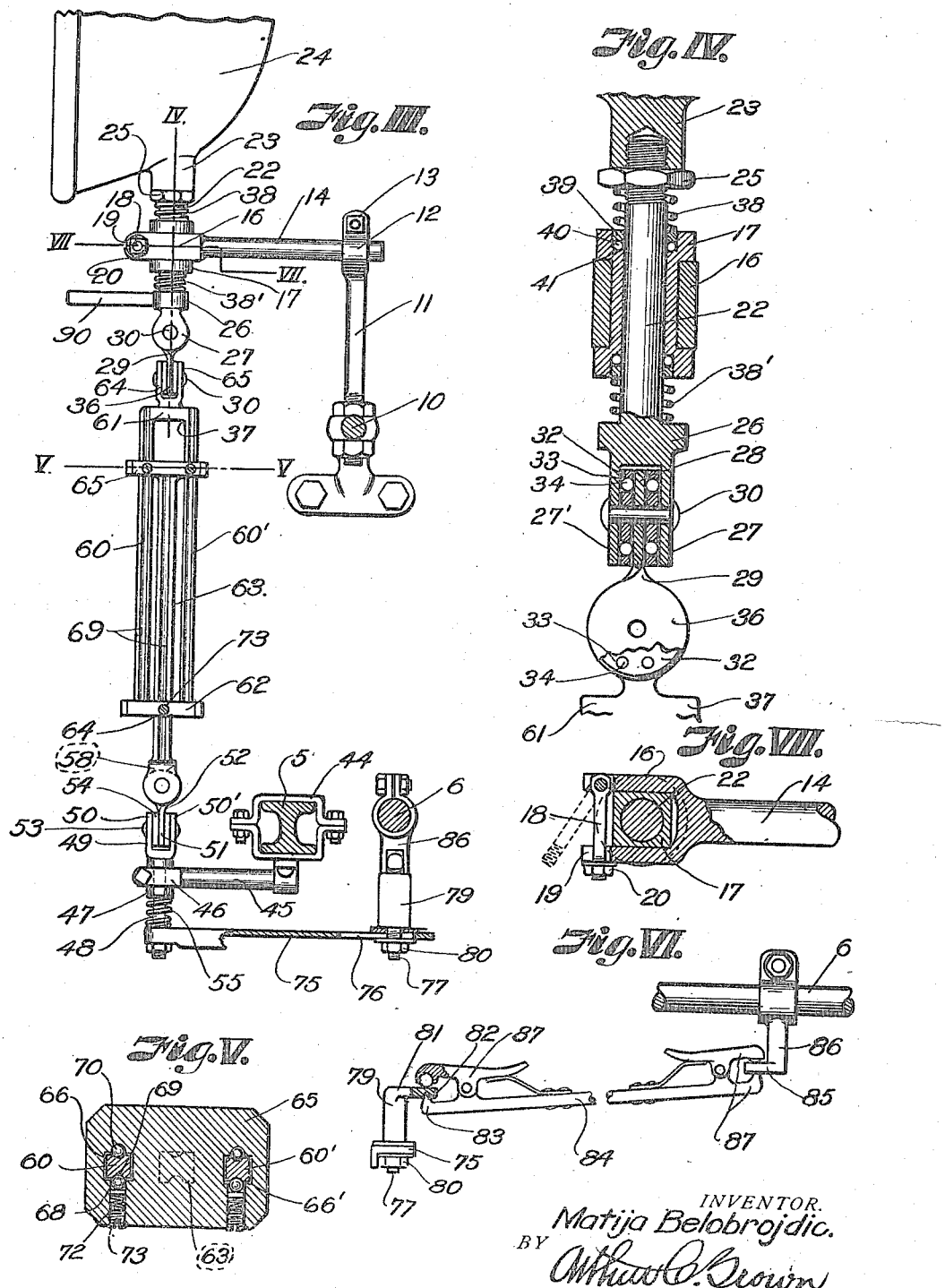

UNITED STATES PATENT OFFICE.

MATIJA BELOBROJDIC, OF KANSAS CITY, KANSAS.

DIRIGIBLE HEADLIGHT FOR AUTOMOBILES.

1,248,999.  Specification of Letters Patent.  Patented Dec. 4, 1917.

Application filed June 16, 1917. Serial No. 175,206.

*To all whom it may concern:*

Be it known that I, MATIJA BELOBROJDIC, a citizen of Croatia, residing at Kansas City, in the county of Wyandotte and State of Kansas, have invented certain new and useful Improvements in Dirigible Headlights for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to dirigible headlights for automobiles and has for its principal object to provide durable and easily operable lamp turning mechanism that may be connected to and operated in conjunction with the vehicle steering mechanism in such a manner that rays of light from the lamps will be projected in the direction of travel of the vehicle steering wheels, as distinguished from the straight ahead direction, relative to the longitudinal axial line of the vehicle, as is ordinarily provided irrespective of the direction assumed by the steering wheels in making a turn.
A further object of the invention is to provide a flexible connecting link, comprising telescoping members and universal joint connections, whereby compensation is made for the vertical and horizontal movement of the lamps relative to the steering mechanism, incidentally resulting from the spring mounting of the vehicle body on which the lamps are mounted.

In accomplishing these objects, I have provided improved details of structure, the preferred forms of which are illustrated in the accompanying drawings, wherein:

Figure I is a front view of an automobile equipped with lamp turning mechanism constructed according to the present invention.

Fig. II is a sectional view of the same on the line II—II, Fig. I.

Fig. III is an enlarged side elevation of the lamp mounting and turning parts, and the connection of the latter with the vehicle steering member.

Fig. IV is an enlarged sectional view on the line IV—IV, Fig. III, illustrating the mounting of the lamp turning shaft and the universal joint connection with the adjustable connecting link.

Fig. V is a sectional view on the line V—V, Fig. III.

Fig. VI is a view of the link connecting member for actuating the lamp turning lever from the knuckle connecting rod.

Fig. VII is a horizontal section on the line VII—VII, Fig. III.

Referring more in detail to the drawings:

1 designates an automobile, which may be of any ordinary type, comprising the usual steering wheels 2 mounted on steering knuckles 3, pivotally mounted in the opposite end yokes 4 of an axle 5, and which are connected and operated synchronously by a connecting rod 6, a body frame 7 supported by its forward end by a spring 8 suspended from the axle.

Rigidly attached to the frame 7 at its opposite sides are fender supporting brackets 10, and mounted thereon in any suitable manner, preferably by threading the same vertically through the brackets, are lamp supporting posts 11, provided at their upper ends with clamp collars 12 equipped with tightening bolts 13 and wherein forwardly extending brackets 14 may be removably and adjustably mounted; the brackets being provided at their forward ends with yoke heads 16 for receiving bearing blocks 17 which after being seated in the yokes may be clamped therein by the bolts 18, (Fig. VII,) that are pivotally attached to the outer ends of one arm of the yokes and adapted to seat at their free ends in outwardly opening slots 19 in the opposite yoke arms, so that nuts 20, carried thereon, may be tightened against the slotted yoke arms to draw the yokes tightly about the bearing blocks and to retain the same in rigid functional position.

Revolubly mounted in each of the bearing blocks 17 is a vertical shaft 22, both of which are threaded at their upper ends into the socketed base bosses 23 of the lamp housings 24 and are each provided with a lock nut 25, which may be tightened against the said bosses to lock the lamp against rotation on the supporting shafts.

The lower end of the shafts 22 is provided with a universal joint head 26, comprising wings 27—27' between which the upper wing 28 of a connecting link 29 is mounted on a transverse pivot pin 30 and which operates thereon between anti-friction members which also are mounted on the pin 30 and between the wings 27—27'; the said anti-friction members preferably comprise disks 32 provided with apertures 33 wherein balls 34 of a greater diameter than the thickness of the disks, are located to engage the inner faces of the outer wings and opposite faces of the link wing 28.

The lower end of the link 29 comprises a wing 36 which lies in plane at right angles to the upper wing 28, and by which connection is made with an adjustable link 37, (presently described), and which in turn is operatively connected with the vehicle steering mechanism to turn the lamps on their supports.

In order to relieve the lamps and their supporting brackets of vibration incidental to travel over rough or uneven surfaces, I extend the shafts 22 beyond the ends of the bearing blocks and surrounding the extended portions and adapted to bear at their inner ends against the opposite ends of the bearing and at their outer ends against the lock nuts 25 and joint heads 26 are coil springs 38—38', whereby all vertical vibration of the lamp shafts is taken up, and in order that the pressure of such springs may not interfere with easy turning of the shaft within the bearings I seat the inner ends of the springs on plates 39 mounted on anti-friction balls 40 that operate in ball sockets 41 at opposite ends of the said bearing blocks.

Attached to the axle 5, by means of a clamp collar 44 and below the lamp shaft provided with the universal joint head 26, is a forwardly extended bracket 45 provided at its forward end with a yoke head 46, wherein a bearing block 47, of the same construction as the block 17, is likewise mounted, and which revolubly carries a vertical shaft 48 provided at its upper end with a yoke head 49 which seats against the upper end of the bearing to prevent a downward movement of the shaft and which, as the head 26, comprises spaced wings 50—50' between which the lower head 51, of a link 52, is pivotally mounted on a transverse pin 53 to operate between anti-friction members 54 similar to those previously described in connection with the head 26.

At its lower end the shaft 48 is inclosed by a coil spring 55 which bears against the lower end of the bearing block 47 and against an arm fixed to the lower end of the shaft (later described), to retain the shaft and bearing parts in functional position.

The link 52, is like the link 29, and has a wing 58 turned in a plane at right angles to that of the lower wing and is connected with the lower end of the adjustable connecting link 37 previously mentioned.

The adjustable link 37 comprises upper and lower telescoping members, the upper member comprising parallel spaced rods 60—60' connected at their upper and lower ends by cross heads 61—62 respectively.

The lower member comprises a single rod 63 adapted for longitudinal slidable movement through an opening 64 located in the lower cross head 62 of the upper member and is fixed at its upper end to a cross head 65 having spaced openings 66—66 therein which slidably contain the parallel rods 60—60' to retain the two members in telescopic relation.

Mounted on the cross head 61 of the upper telescoping member and on the lower end of the rod 63 are yokes heads 64—65 which respectively pivotally receive the lower and upper wings 36 and 58 of the connecting links 29 and 52, so that turning of the lower shaft 48 through the universal joint connections and telescoping link members will similarly turn the upper lamp shaft 22 regardless of any horizontal or vertical movement of the upper shaft relative to the lower shaft incidental to the suspended spring mounting of the body parts whereon the lamp supporting brackets are fixed.

In order that friction between the cross heads and sliding rods of the telescoping links may be reduced to a minimum to make the link easily operable and durable, I provide each of the cross heads with the ball sockets 68 and the rods that operate therein with ball channels 69 wherein antifriction balls 70 may operate; the balls being located in functional position by providing the heads with channels 72 which open to the sides thereof (Fig. V), and are yieldingly held against the sliding rods by means of coil springs located within the channels and tensioned against the balls by plugs 73 threaded into the ends of the channel.

Fixed to the lower end of the shaft 48 is a rearwardly extending lever 75 which terminates below the knuckle connecting rod 6 and is provided with a longitudinally extended slot 76 through which the threaded shank 77 of a post 79 may be extended and the latter located at an adjusted position along the lever by tightening a nut 80 on the shank against the lever.

Extending laterally from the post 79 (Fig. VI) is an arm 81, having a pointed socket 82 therein adapted for receiving an inturned tooth 83 at the end of a connecting link 84 which at its opposite end is similarly attached to an arm 85 extended from a post 86 fixed to the connecting rod 6; the teeth 83 being yieldingly held in place by spring pressed jaws 87 that are pivotally mounted on the link at its opposite end and which bear against the sides of the post arms opposite the socketed faces.

As only one of the vehicle lamps is connected directly with the steering mechanism, it is necessary that the opposite lamp be operated from the lamp and this is accomplished by providing each of the lamp mounting shafts 22 with forwardly extending lever arms 90 which are connected to actuate the lamps in union by a connecting link 92, the connection being made in the same manner as the lever 75 is connected with the knuckle connecting rod 6.

Assuming that the parts are so constructed and the lamps mounted as described, it is apparent that longitudinal movement of the knuckle connecting rod 6 will, through the link 84, and lever 75, rotate the shaft 48 in its mounting and through the adjustable parts of the link 37 a similar movement will be given the upper shaft 22 to synchronously turn the lamps to project their light rays in the direction assumed by the vehicle steering wheels.

It is also apparent that the telescopic and universal joint connection between the fixed lamp and steering parts will permit relative vertical or horizontal movement of the parts without binding or injuring the connecting parts.

It will be seen also that the arc through which the lights may be turned may be adjusted by movement of the post 79 along the lever slot 76 toward or from the end of the lever.

It is further apparent that the parts may be quickly and easily dismounted if desired or that they may be used as the ordinary fixed lamp by disconnecting the link 84 from the rod 6.

Having thus described my invention, what I claim as new therein, and desire to secure by Letters-Patent, is:

1. The combination with a vehicle axle, wheel steering mechanism, and a spring mounted body, of a lamp bracket mounted on the body, a vertical lamp supporting shaft revolubly carried by said bracket, a bracket fixed on the vehicle axle, a vertical turning shaft revolubly mounted in the axle bracket, a turning lever fixed to the last named shaft and operatively connected with the steering mechanism and a telescopic link connecting the lamp supporting shaft with the turning shaft for the purpose set forth.

2. The combination with a vehicle axle, a steering device movable longitudinally relative to the axle, and a vehicle body supported on the axle, of a bracket mounted on the body, a vertical lamp supporting shaft revolubly mounted in said bracket, a bracket fixed to the vehicle axle, a vertical turning shaft revolubly mounted in the said bracket, a telescopic link connected by universal joint mechanism at its upper and lower ends to the lamp supporting shaft and to the turning shaft, and a lever fixed to the turning shaft and operatively connected with the steering device, for the purpose set forth.

3. The combination with a vehicle axle, a steering device movable longitudinally relative to the axle and a vehicle body supported on the axle, of brackets mounted on said body, vertical lamp supporting shafts revolubly mounted in said brackets having turning arms extending laterally therefrom and a link pivotally connected at its opposite ends to said turning arms, a bracket fixed to the vertical axle, a vehicle turning shaft revolubly mounted in said bracket, a telescoping link connected at its opposite ends through universal joint mechanism with the turning shaft and with one of said lamp supporting shafts and a lever fixed to the turning shaft having steering device, whereby said lamps may be operated in synchronism therewith.

4. The combination with a vehicle axle, a steering device movable longitudinally relative to the axle and a spring mounted vehicle body supported on the axle, of brackets fixed to the said body, lamp supporting shafts revolubly mounted on said brackets, turning arms extended laterally from said lamp supporting shafts, a link pivotally connected at its opposite ends by yieldable clamp members to said turning arms, a bracket fixed to the vehicle axle, a vertical turning shaft revolubly mounted in said bracket, a telescoping link connected at its opposite ends through universal joint mechanism with the turning shaft and with one of said lamp supporting shafts, a lever fixed to the turning shaft and a link pivotally connected by yieldable clamp mechanism with the steering device and said lever, for the purpose set forth.

In testimony whereof I affix my signature.

MATIJA BELOBROJDIC.

Copies of this patent may be obtained for five cents each, by addressing the "Commissioner of Patents, Washington, D. C."